H. SANTROCK.
DRIVE WHEEL.
APPLICATION FILED DEC. 2, 1915.

1,200,762.

Patented Oct. 10, 1916.

WITNESSES:
Jas. K. McCathran
J. T. Mawhinney

Henry Santrock, INVENTOR

BY

Attorney

UNITED STATES PATENT OFFICE.

HENRY SANTROCK, OF KENSINGTON, KANSAS.

DRIVE-WHEEL.

1,200,762.　　　　Specification of Letters Patent.　　Patented Oct. 10, 1916.

Application filed December 2, 1915. Serial No. 64,755.

*To all whom it may concern:*

Be it known that I, HENRY SANTROCK, a citizen of the United States, residing at Kensington, in the county of Smith and State of Kansas, have invented a new and useful Drive-Wheel, of which the following is a specification.

This invention relates to an improved wheel for driving purposes, or for the purpose of transmitting power to a shaft to turn the same by hand, or by a rope passing over the wheel.

An object of the present invention is to provide a light, strong wheel of this character, which may be very economically produced from sheet metal, and particularly angle iron, the invention providing a peculiar structure wherein the angle iron need not of necessity be very thick or heavy, in order to form a strong wheel capable of withstanding considerable pressure.

Another object of the invention is to provide a peculiar spoke construction, and to peculiarly form the outer ends of the spokes for receiving an angle iron rim.

A still further object of the invention is to provide the wheel with a crank handle of peculiar form, which combines a crank handle structure with a locking key structure for securing the improved wheel upon a shaft, or the like, to turn with the shaft.

The above and other objects and advantages of the invention will be more fully brought out in the following detail description of the present preferred embodiment of the invention, the same being disclosed in the accompanying drawing, wherein:—

Figure 1:
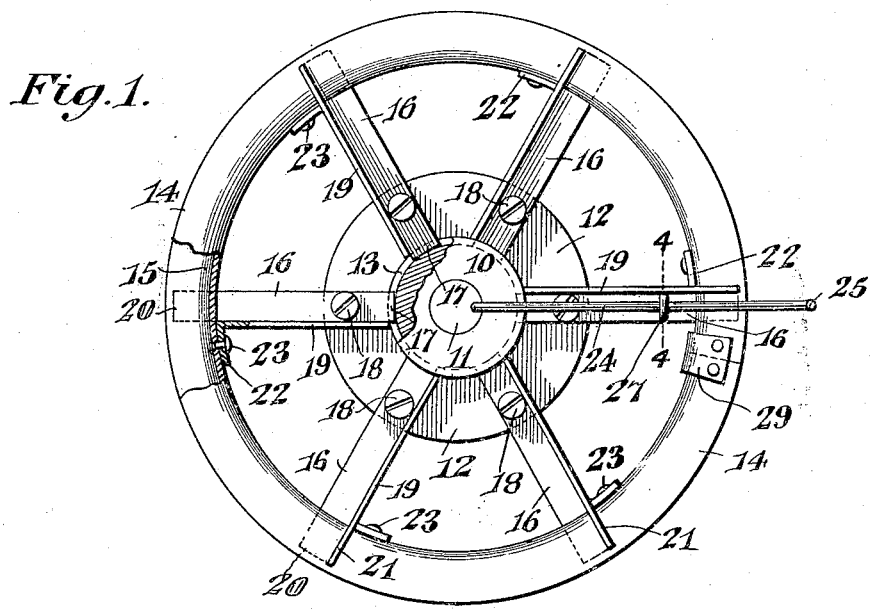
Figure 2:
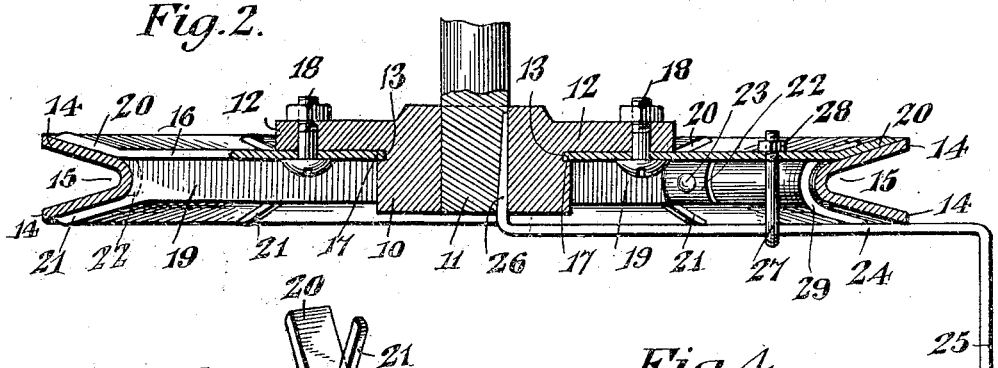
Figure 3:
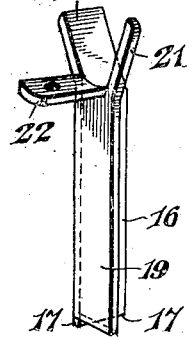
Figure 4:
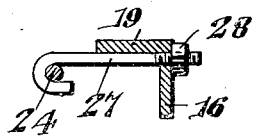

Figure 1 is a side elevation of the improved wheel, as applied to a shaft. Fig. 2 is a horizontal section, taken through the wheel and shaft immediately above the crank handle as shown in Fig. 1. Fig. 3 is a detail perspective view of one of the spokes. Fig. 4 is a transverse section, taken on the line 4—4 through one of the spokes, showing the handle and its separable connection with the spoke.

Referring to this drawing, wherein like parts are designated by similar numerals of reference throughout the several views, 10 designates the hub, of any suitable construction or form, but preferably of the cylindrical form shown. The hub 10 is provided with a central aperture into which is fitted a shaft 11 adapted to be turned by the rotation of the wheel. The hub 10 carries, adjacent its inner side, a hub plate or flange 12, of disk form, and providing forward and rear flat faces about the hub. This hub plate or flange may be otherwise associated with the hub 10 than being integral therewith, as shown in the drawing. Preferably, between the hub plate 12 and the hub 10, there is formed an annular groove or recess 13, the inner wall of which is in the plane of the outer surface of the hub plate 12.

Concentric about the hub 10 is a rim 14. This rim 14 is formed preferably from angle iron, as shown to advantage in Fig. 2, and in cross section, is of substantially V-shape. The rim thus formed provides a peripheral groove 15, in which may be placed a belt, cable, or the like, for turning the wheel, or which may be actuated by the rotation of the wheel.

The angle iron rim 14 is supported upon the hub by a peculiar spoke arrangement and construction. Each spoke of the wheel is formed of angle iron, has a flat flange 16 lying flat against the inner side of the hub plate 12, and provided at its inner end with a lip 17 in alinement therewith, adapted for engagement in the recess 13 to anchor the inner end of the spoke to the hub, and hold it from moving outwardly from the plate 12. Further, the flat flanges 16 are secured to the hub plate by means of bolts 18, which pass through the flanges 16 and through the plate 12, the bolts 18 being secured in place by nuts, or the like, to hold the spokes rigidly to the plate. Thus, the spokes are held close against the plate 12, the bolts 18 passing through the spokes, and the plate adjacent the outer edge of the latter, so that the outer ends of the spokes are held from swinging forwardly away from the plate 12, and the inner ends of the spokes are held against the plates by the wall of the peripheral recess or groove 13, at the inner end of the hub 10.

The opposite transverse or reinforcing flange 19 of each angle iron spoke, abuts at its inner end against the peripheral face of the hub and extends outwardly along one edge of the flat flange 16 to the rim 14 to retain the flat flange from buckling or bending, and to also brace the wheel against any lateral distortion. The outer end of each spoke is split to provide three separate parts. The flat flange 16 provides one part at its outer extremity in the form of a flat ear 20, which conforms to and lies against the inner side of the rim 14, as clearly shown in Fig.

2. The transverse flange 19 is split into two parts, one part extending from the outer edge of the flange forming an ear 21 diverging from and disposed opposite to the ear 20, the ear 21 being adapted to lie against and conform to the outer side of the rim 14. The intermediate portion of the flange 19 is bent over at substantially right angles to the body of the flange to provide a securing lip 22 adapted to rest against the inner side of the rim 14, and being preferably slightly curved transversely to conform to the curvature of the inner side of the rim. This lip 22 comprises a seating member in addition to a securing member, as the lip supports the rim, which rests thereon. A rivet 23, or other suitable fastening device, passes through the inner portion of the rim 14, and through the lip 22 for securely holding the lip to the rim, retaining the spokes from displacement, and holding the rim from sliding circumferentially through the ends of the spokes. It will be noted that each spoke being thus split and bent, provides a socket to receive the rim and hold it against lateral and peripheral displacement with respect to the spoke.

While the wheel may be driven by a belt passing over the rim 14, by the application of power to the shaft 11, or in any other suitable manner, it is a purpose of this invention to provide the wheel with a crank handle by means of which the wheel may be manually turned. The crank handle, designated as 24 in the drawing, is shown in the form of a rod or bar circular in cross section, and having an outturned handle portion 25 adapted to be grasped in the hand for applying pressure to the wheel. The body portion of the crank handle 24 extends radially from the hub 10, preferably longitudinally, and in parallelism with one of the spokes. The outer end of the crank handle 24 rests against the outer side of the rim 14, while the inner end of the crank handle is provided with a wedge-shaped key 26 adapted for engagement in the opening in the hub, and into a key-way formed in one side of the shaft 11. A detachable clip 27 is carried by the spoke adjacent to the handle 24, the clip being in the form of a hook-bolt, the hook of which passes over the crank handle 24, and the shank of which is threaded and passed through the flat flange 16 of the adjacent spoke. A binding nut 28 is mounted on the threaded end of the bolt 27 to draw the bolt inwardly through the spoke and thus bind the crank handle 24 at its opposite ends in the hub opening and against the rim respectively, so as to securely hold the crank handle in place and lock the key 26 in position. As the key 26 rests in a key-way in the shaft 11, and as the clip 27 secures the crank handle to the spoke adjacent the outer ends of the same, the handle 24 is held in fixed relation radially upon the wheel, and is thus in position to receive pressure from the hand for rotating the wheel.

The strip of angle iron from which the rim 14 is constructed, has its meeting ends secured in any desired manner. As shown in Fig. 1 of the drawings, the meeting ends of the rim 14 abut so as to present a smooth surface to the belt in the groove 15 in the wheel. These meeting ends are held together by a joining plate 29, which overlaps the inner sides of the meeting ends of the rim, and which is preferably riveted, or otherwise permanently attached, to the opposite ends of the rim, so as to hold them in alinement and against the joining plate. When it is desired to remove the wheel from the shaft 11, it is only necessary to loosen the clip 27, remove the crank handle 24 therefrom, and withdraw the key 26 from the shaft 11. The wheel is then freed and may be easily removed from the shaft. It will be noted that the peculiar formation of the rim and the spokes provides an economical and comparatively simple structure of wheel, wherein nearly all parts of the same may be made from sheet metal shaped into angle iron and stamped or cut, to provide the few ears and other parts which support the rim and secure the same to the hub.

The crank handle 24 is preferably made of rod iron, so that the handle will have a certain degree of resiliency. The handle is so formed, in order that, when the clip 27 is tightened, the rod will bow inwardly against the spoke, and will yieldingly press and hold the wedge-shaped key 26 in the key-way within the hub opening. Also, this resiliency tends to hold the crank handle rigidly against the side of the rim 14. It will be further noted that, as seen in Fig. 3, the intermediate portion, or shank, of the hook-bolt, or clip, 27 lies flat against the inner face of the transverse flange 19 of the spoke, so that the flange serves as a reinforcement or support for the clip 27 to hold the same against swinging circumferentially of the wheel. The resiliency of the handle admits of the springing of the same from beneath the hook of the bolt 27, after the latter has been slackened to an appreciable extent.

It is understood that various changes may be made in the minor details of construction of the above set forth wheel, without departing from the spirit of the invention, and being limited only by the scope of the following claims.

What is claimed is:—

1. A wheel having a hub provided with an annular groove in its periphery having opposed walls, and having a peripheral flange forming a continuation of one wall of said groove, a plurality of spokes projecting at their inner ends into the groove and bearing against the side of said flange, and securing means binding the spokes against the flange to hold the inner ends of the spokes in the groove, the inner ends of said spokes being held from lateral displacement by the opposite walls of the groove.

2. In a wheel, a hub, spokes radiating from the hub, and a rim carried upon the outer ends of the spokes, the outer end of each spoke being split into three parts to provide a pair of diverging lateral ears for engagement against the opposite sides of the rim to hold it from lateral displacement, and to provide an intermediate lip bent over and seating against the inner side of the rim to support the same.

3. In a wheel, a hub having a hub plate on the inner end thereof, said hub having an annular recess therein adjacent said hub plate, a plurality of angle iron spokes having flat flanges lying close against the hub plate and provided with tongues projecting into said recess in the hub, bolts securing said flanges to said hub plate, the outer ends of the spokes being split and diverging outwardly to provide spaced apart ears and an intermediate securing and seating lip, a rim of angular form fitting between said ears and seated on said lip, and a rivet passing through each lip and said rim for securing the rim to the ends of the spokes.

4. In a wheel, a hub having an outstanding flange at its inner side, a plurality of radiating spokes rectangular in cross section having flat flanges adapted for securement against the hub flange and having transverse flanges for reinforcing the flat flanges, the outer ends of said spokes being split to provide opposed ears diverging outwardly and an intermediate lip turned over between the ears, the ears and the lip of each spoke forming a socket at the outer end of each spoke, a V-shaped rim seated in said sockets, and rivets passing through said lips, and said rim, for securing the rim in the sockets.

5. In a wheel, a hub, a shaft fitting in the hub and having a key-way in one side thereof, spokes radiating from the hub, a rim carried on the ends of the spokes, a crank handle engaging against one side of the hub and extending radially therefrom and engaging against one side of the rim, said crank handle having an inturned wedge-shaped inner end providing a key engaging in said key-way, and a clip mounted on one of the spokes and engaging the crank handle to bind the latter against the hub and the rim, and hold said key in the key-way.

6. In a wheel, a hub, spokes radiating from the hub, and a rim carried on the outer ends of the spokes, a shaft projecting into the hub, and having a key-way in one side thereof, a crank handle having a wedge-shaped key in its inner end engaging in said key-way to lock the wheel to the shaft, said handle extending radially from the hub and substantially in parallelism with one of the spokes, and bearing against the rim at its outer end, and a detachable clip carried upon said spoke for engagement with the crank handle to bind the same against the side of the wheel and hold the key in the key-way.

7. In a wheel, a hub, angle iron spokes projecting radially from the hub and having sockets upon their outer ends, a rim seated in said sockets, a crank handle bearing against one side of the wheel, a hook bolt engaging about the crank handle and being secured through one of the flanges of one of the spokes and adapted to be tightened to bind the handle against the side of the wheel, the intermediate portion of the hook bolt bearing against the opposite flange of said spoke to reinforce the hook bolt and hold the same against circumferential displacement.

8. In combination with a wheel having a hub, spokes, and a rim, a resilient crank handle engaging near its opposite ends against one side of the hub and rim, and having a key for engagement in the hub to lock the same to a shaft, and an adjustable clip carried by one of the spokes, and engaging the crank handle intermediate its ends to draw the same inwardly toward the spoke and yieldingly bind said key and handle in place.

9. In a wheel, a hub having a hub plate adjacent one end thereof, spokes of angle iron construction having one flange bearing against a hub plate and having their opposite flanges projecting away from the hub plate, the inner edges of said opposite flanges extending from said hub plate substantially in parallelism with the longitudinal axis of the hub and lying in contact with the sides of the hub to brace the spokes against lateral bending.

10. A drive wheel comprising a hub, a plurality of spokes radiating from the hub, a rim mounted on the outer ends of the spokes, a handle engaging against one side of the wheel and bearing at its inner end against the hub and at its outer end against the rim, said handle projecting radially beyond the rim and lying substantially in parallelism with one of said spokes, and a clip carried by said spoke and engaging an intermediate portion of said handle to draw the same inwardly and bind the same against the side of the hub and the rim.

11. In a drive wheel, the combination with a hub, a spoke radiating from the hub, and a rim at the outer end of the spoke, of a handle engaging against one side of the hub and the rim, anchoring means on the inner end of the handle engaging the hub to hold the inner end of the handle thereagainst, and a clip carried by the spoke and engaging the handle outwardly of the hub to hold the handle firmly against the hub and rim and prevent the handle from slipping against the side of the wheel.

12. In combination with a drive wheel having a hub, a spoke, and a rim, a handle engaging against one side of the wheel, and having a key upon its inner end projecting into the hub for anchoring the inner end of the handle to the hub, and a clip carried by the spoke and engaging the handle outwardly of the hub to bind the key in the hub and to bind the outer end of the handle against the rim of the wheel.

In testimony that I claim the foregoing as my own, I have hereto affixed my signature in the presence of two witnesses.

HENRY SANTROCK.

Witnesses:
H. F. BALL,
J. H. BALL.

Copies of this patent may be obtained for five cents each, by addressing the "Commissioner of Patents, Washington, D. C."